(12) United States Patent
Yang

(10) Patent No.: US 7,934,646 B2
(45) Date of Patent: May 3, 2011

(54) FACE PANEL ASSEMBLY WITH AN RFID MODULE

(75) Inventor: Dong-Ying Yang, Taipei (TW)

(73) Assignee: International Currency Technologies Corporation, Taipei (TW)

( * ) Notice: Subject to any disclaimer, the term of this patent is extended or adjusted under 35 U.S.C. 154(b) by 538 days.

(21) Appl. No.: 12/213,811

(22) Filed: Jun. 25, 2008

(65) Prior Publication Data

US 2009/0321516 A1    Dec. 31, 2009

(51) Int. Cl.
*G06F 7/08* (2006.01)
(52) U.S. Cl. ........................................ 235/381
(58) Field of Classification Search .................. 235/381, 235/375
See application file for complete search history.

(56) References Cited

U.S. PATENT DOCUMENTS

| 7,490,054 B2* | 2/2009 | Reade et al. ..................... 705/16 |
| 2008/0135374 A1* | 6/2008 | Atsuta et al. .................. 194/350 |
| 2009/0218395 A1* | 9/2009 | Chien et al. ..................... 235/380 |

* cited by examiner

*Primary Examiner* — Daniel A Hess
(74) *Attorney, Agent, or Firm* — Bacon & Thomas, PLLC

(57) ABSTRACT

A face panel assembly is disclosed having a mounting flange for detachably fastening to a bill/coin acceptor in an automatic vending machine, a slot for the insertion of a bill/coin into the bill/coin acceptor, and a RFID module, which has a sensor for sensing a RFID stored-value card for enabling the RFID module to fetch stored data from the RFID stored-value card and to transmit the fetched data to the automatic vending machine, and a transmission interface (wired or wireless type) for communication between the RFID module and the automatic vending machine.

18 Claims, 9 Drawing Sheets

FACE PANEL ASSEMBLY WITH AN RFID MODULE

BACKGROUND OF THE INVENTION

1. Field of the Invention

The present invention relates to an automatic vending machine technology and more specifically, to a face panel assembly with an RFID module for use with a bill/coin acceptor in an automatic vending machine for enabling the automatic vending machine to provide bill/coin/RFID stored-value card transaction modes.

2. Description of the Related Art

Following fast development of RFID (Radio Frequency Identification) technology, RFID stored-value cards have been intensively used in many places to substitute for conventional paper cards and contact type magnetic cards for different transactions. A paper card may be damaged easily when wetted or curved. A contact type magnetic card requires direct contact, and the stored data tends to be damaged by an external magnetic field. Further, when using a paper card or a contact type magnetic card, a user must take the paper card or the contact type magnetic card out of the pocket or purse. Furthermore, during the use of the contact type magnetic card, the user must insert the contact type magnetic card through the sensing slot. On the contrary, when a RFID stored-value card is used, the user needs no to take the RFID stored-value card out of the pocket or purse, and the stored value can be read by a RFID reader at a distance. Therefore, RFID stored-value cards are widely invited by consumers.

Further, automatic vending machines are intensively used everywhere in different countries around the world. An automatic vending machine may accept bills. There are advanced automatic vending machines using RFID technology. However, an automatic vending machine using RFID technology has a specially designed circuit architecture. A RFID reader-writer machine cannot be directly used in a conventional automatic vending machine because the circuit architecture of a conventional automatic vending machine is not compatible.

When using a RFID reader-writer machine in an automatic vending machine, the installation of the RFID reader-writer machine greatly increases the dimension of the automatic vending machine.

Further, when a user wishes to operate value-adding to a RFID stored-value card, he (she) must go to a railway station, bus station or rapid transport station to operate a RFID reader-writer machine.

Therefore, it is desirable to provide an automatic vending machine, which has a RFID module incorporated in the bill/coin acceptor thereof to provide multiple transaction modes while saving installation space and to allow a user to operate value-adding to a RFID stored-value card.

SUMMARY OF THE INVENTION

The present invention has been accomplished under the circumstances in view. It is therefore the main object of the present invention to provide a face panel assembly, which has an RFID module incorporated therein for use with a bill/coin acceptor in a conventional automatic vending machine, for enabling the automatic vending machine to provide multiple transaction modes.

It is another object of the present invention to provide a face panel assembly with a RFID module for automatic vending machine, which saves the internal space of the automatic vending machine, simplifies the control circuit arrangement of the automatic vending machine, and facilitates the maintenance work of the automatic vending machine.

It is still another object of the present invention to provide a face panel assembly with a RFID module for automatic vending machine, which allows a user to operate value-adding to a RFID stored-value card.

To achieve these and other objects of the present invention, the face panel assembly comprises a mounting flange for detachably fastening to a bill/coin acceptor in the automatic vending machine with screws, a slot for the insertion of a bill/coin into the bill/coin acceptor, and a RFID module, which has a sensor for sensing a RFID stored-value card for enabling the RFID module to fetch stored data from the RFID stored-value card and to transmit the fetched data to the automatic vending machine, and a transmission interface (wired or wireless type) for communication between the RFID module and the automatic vending machine. Further, the face panel assembly can be provided with a sliding slot for the sliding of a card (monetary card, credit card, chip card or the like).

DETAILED DESCRIPTION OF THE PREFERRED EMBODIMENT

Figure 1:
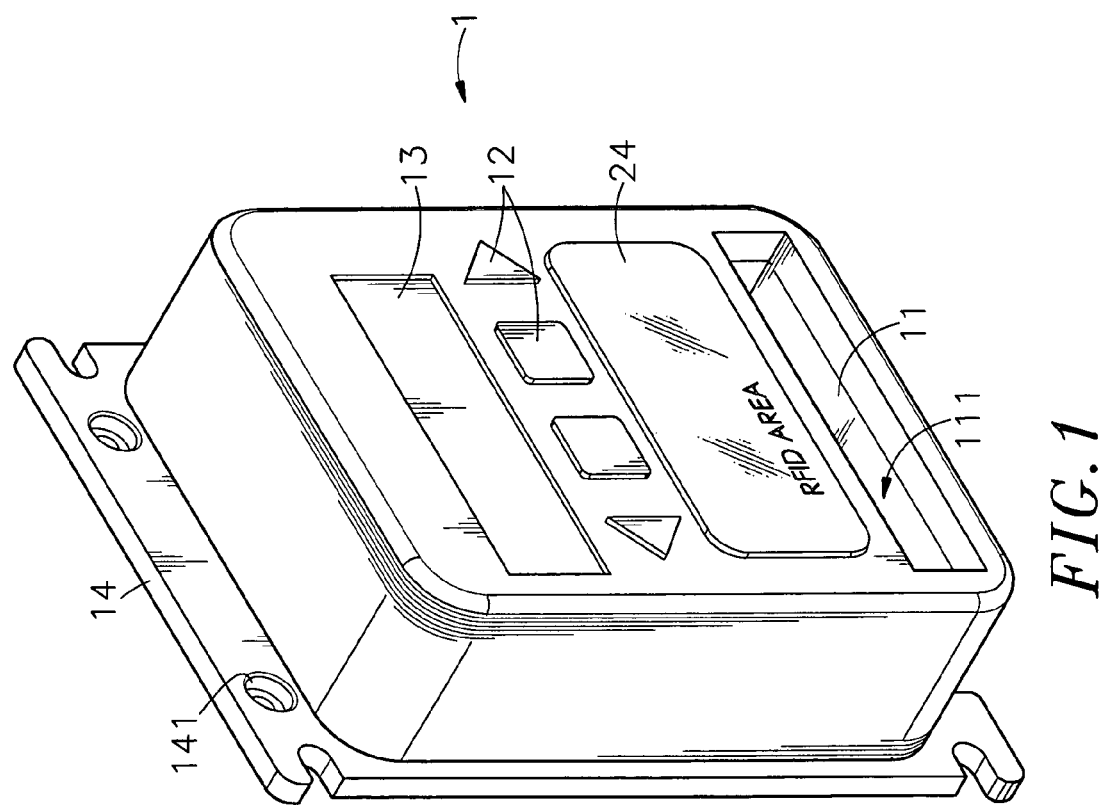
FIG. 1 is an elevational view of a face panel assembly in accordance with a first embodiment of the present invention.
Figure 3:
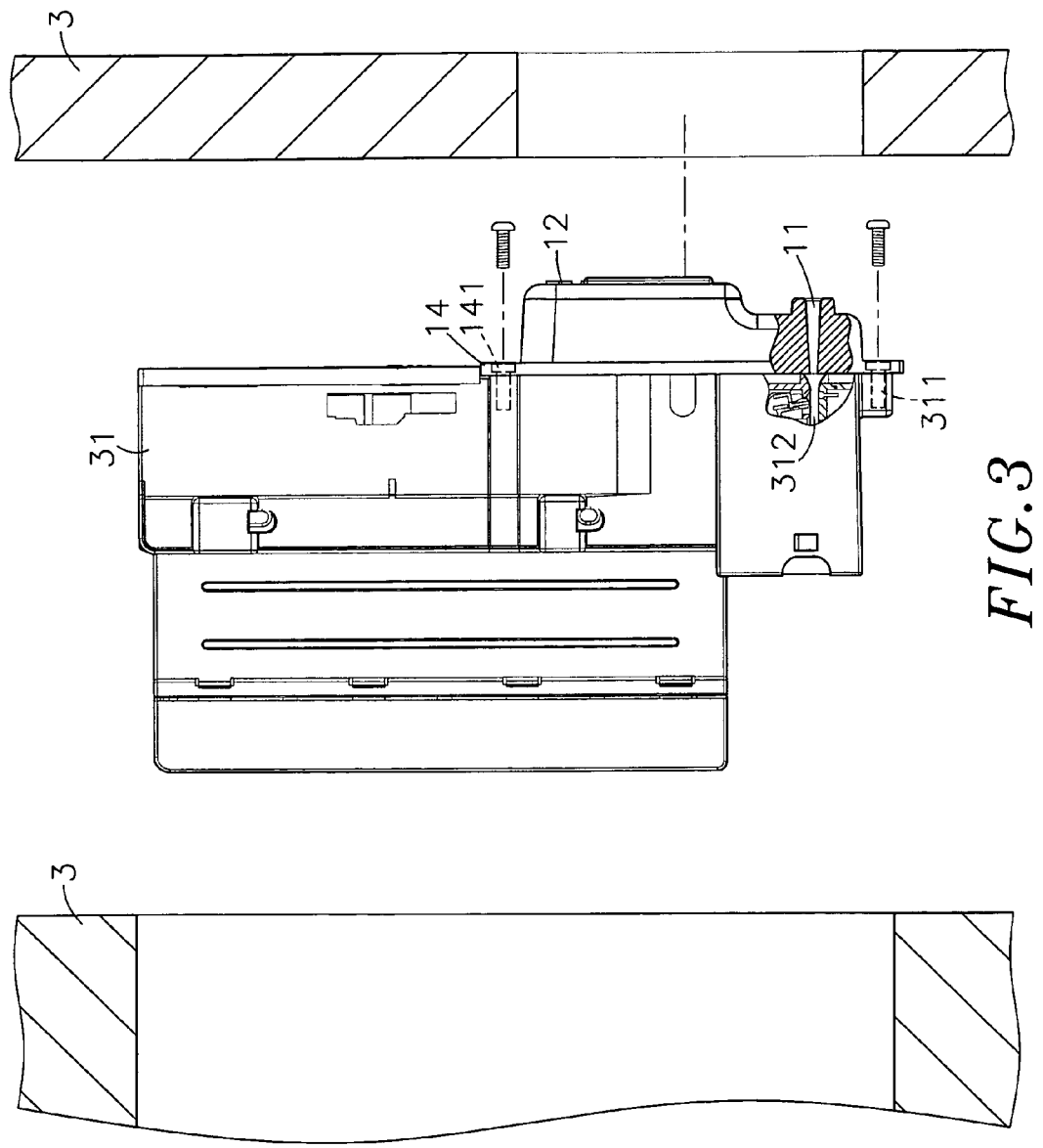
FIG. 3 is a schematic sectional view showing installation of the face panel assembly in the automatic vending machine according to the first embodiment of the present invention.

Referring to FIGS. 1 and 3, a face panel assembly 1 in accordance with a first embodiment of the present invention is shown for use in an automatic vending machine 3 for connection to one side of an acceptor 31. The face panel assembly 1 is configured subject to the transaction mode (bill, coin or token) of the automatic vending machine 3, having mounted therein a RFID module 2. Further, the face panel assembly 1 has at least one slot 11 disposed on the front side thereof, a set of operating buttons 12, and a display screen 13 for displaying information. The face panel assembly 1 further has a passage 111 backwardly extending from the slot 11, and a mounting flange 14 with mounting through holes 141 for mounting.

Figure 2:
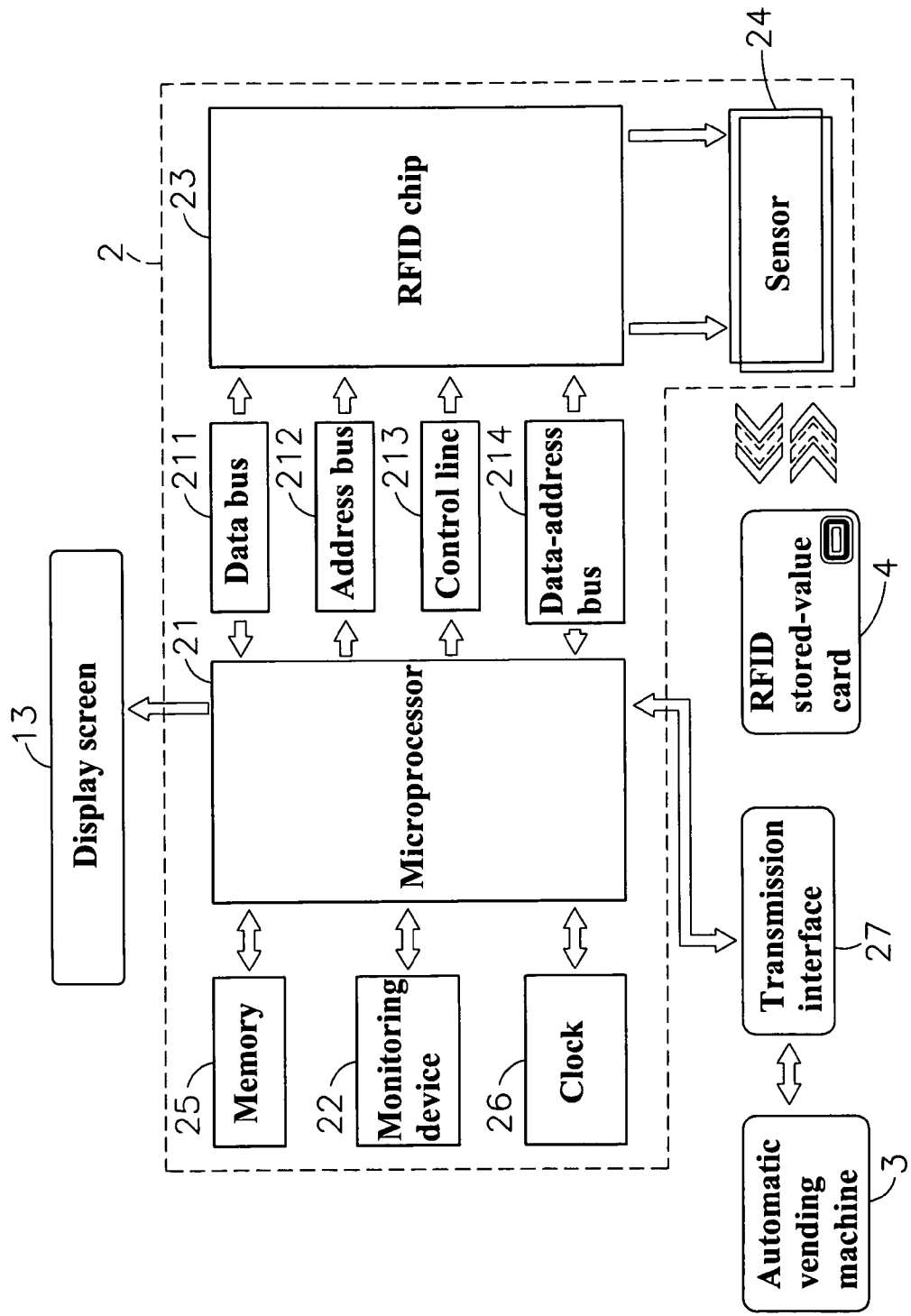
FIG. 2 is a circuit block diagram of the face panel assembly according to the first embodiment of the present invention.

Referring to FIG. 2 and FIG. 1 again, the RFID module 2 is build in the face panel assembly 1, comprising a microprocessor 21 for processing data. The microprocessor 21 has electrically connected thereto a data bus 211, an address bus 212, a control line 213, a data-address bus 214, a monitoring device 22, a memory 25 and a real time clock 26. The RFID module 2 further comprises a RFID chip 23 electrically connected to the microprocessor 21 through the data bus 211, the address bus 212, the control line 213 and the data-address bus 214, and a sensor 24 electrically connected to the RFID chip 23 for the induction of a RFID stored-value card 4. The sensor 24 is disposed on the front side of the face panel assembly 1.

The face panel assembly 1 is made by means of a modularized production method subject to the transaction mode (bill, coin or token) of the automatic vending machine 3. During installation, as shown in FIG. 3, the face panel assembly 1 is attached to the bill/coin acceptor 31 to have the mounting through holes 141 of the mounting flange 14 of the face panel assembly 1 be respectively affixed to respective mounting screw holes 311 of the bill/coin acceptor 31 with a respective screw. After installation of the face panel assembly 1, the passage 111 is kept in communication with a bill/coin inlet 312 of the bill/coin acceptor 31. According to this first embodiment, the slot 11 of the face panel assembly 1 is a bill slot, the acceptor 31 is a bill acceptor, and the inlet 312 of the acceptor 31 is a bill inlet. When a person is using the automatic vending machine 3, he (she) can insert a bill into the bill slot 11 or approach the sensor 24 of the RFID module 2 at the front side of the face panel assembly 1 with a RFID stored-value card 4. When the RFID stored-value card 4 approaches the sensor 24, the sensor 24 reads in the data content of the RFID stored-value card 4, and then the RFID module 2 transmits the obtained data content to the automatic vending machine 3 for making a transaction.

The RFID module 2 is connected to the automatic vending machine 3 through a transmission interface 27. The transmission interface 27 can be a wired transmission interface such as IEEE1394, USB, STATA, IDE, RS232, serial SCSI or parallel SCSI, or a wireless transmission interface such as antenna, radio frequency, infrared, bluetooth technique or the like, that is capable of transmitting data from the RFID module 2 to the automatic vending machine 3. When changing the type of the face panel assembly 1, the transmission interface 27 must be reset to have the RFID module 2 be in connection with the automatic vending machine 3.

Figure 4:
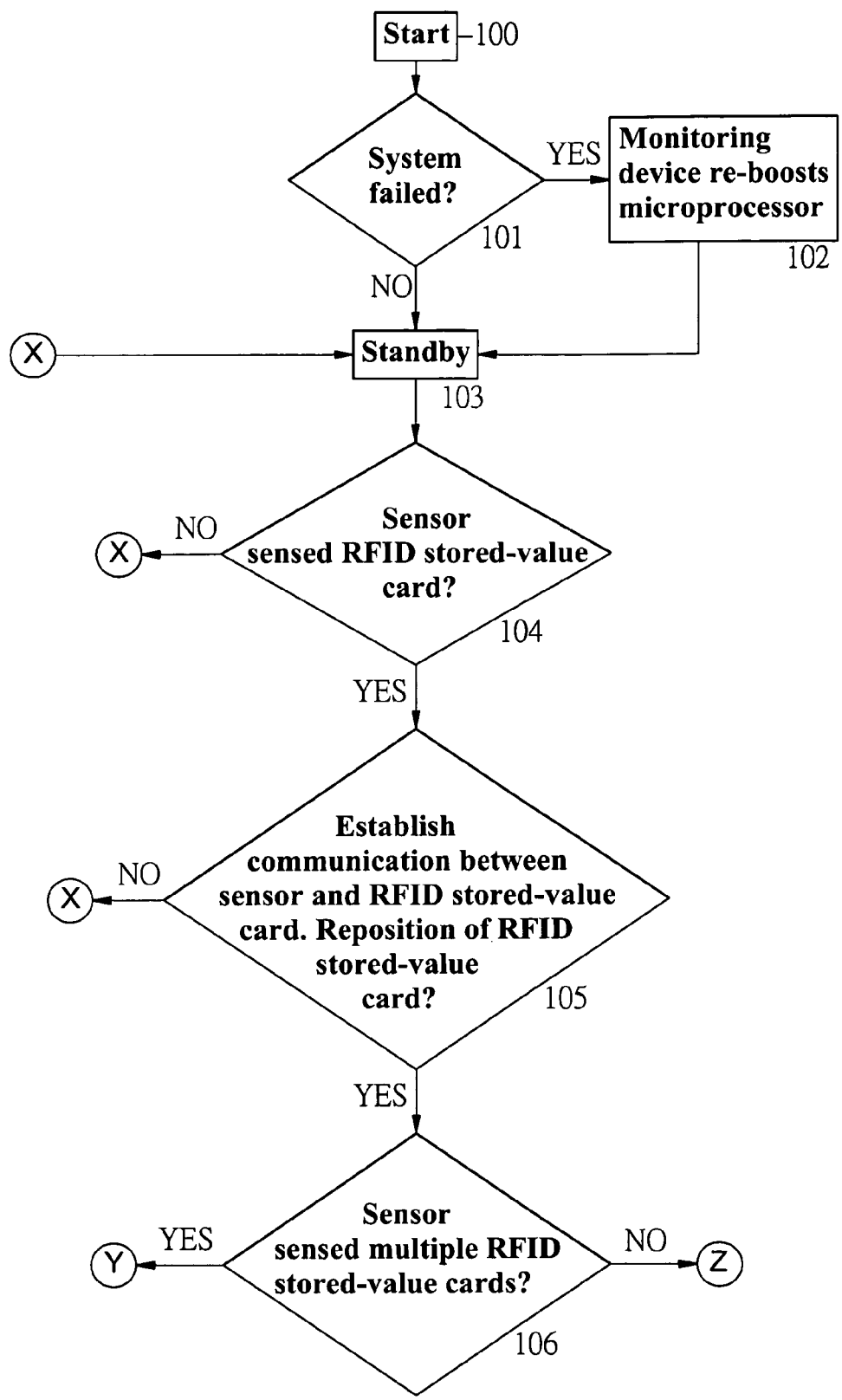
FIG. 4 is an operation flow chart of the RFID module according to the first embodiment of the present invention (I).
Figure 5:
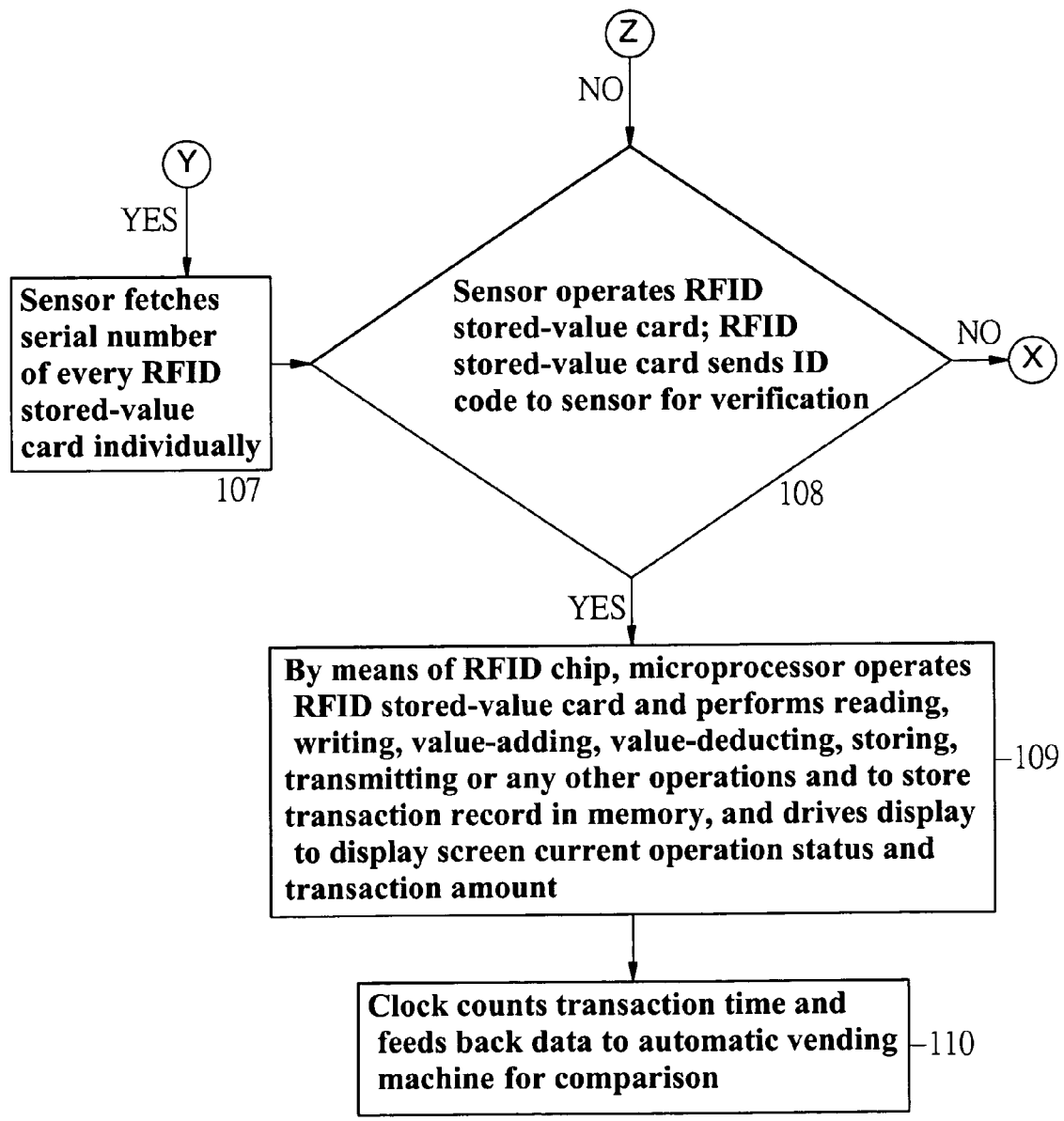
FIG. 5 is an operation flow chart of the RFID module according to the first embodiment of the present invention (II).

Referring to FIGS. 4 and 5, during operation of the present invention, the RFID module 2 runs subject to the following steps:

100 Start
101 Judge whether or not the system is failed? And then proceed to step 102 when failed, or step 103 when normal.
102 The monitoring device 22 drives the microprocessor 21 to start again.
103 Standby.
104 Judge whether or not the sensor 24 senses a RFID stored-value card 4? And then proceed to step 105 when positive, or return to step 103 when negative.
105 Establish a communication between the sensor 24 and the RFID stored-value card 4, and judge whether or not the RFID stored-value card 4 is repositioned? And then proceed to step 106 when yes, or return to step 103 when not.
106 Judge whether or not the sensor 24 senses multiple RFID stored-value cards 4? And then proceed to step 107 through Y when the sensor 24 senses multiple RFID stored-value cards 4, or step 108 through Z when not.
107 The sensor 24 fetches a serial number of every RFID stored-value card 4 individually. And then proceed to step 108.
108 The sensor 24 operates the RFID stored-value card 4 subject to a selection so that the RFID stored-value card 4 sends its ID code to the sensor 24 for verification. And then proceed to step 109 when the ID code of the RFID stored-value card 4 is checked to be OK, or return to step 103 when the ID code is denied.
109 By means of the RFID chip 23, the microprocessor 21 operates the RFID stored-value card 4 and performs a reading, writing, value-adding, value-deducting, storing, transmitting or any other operation and to store a transaction record in the memory 25, and drives the display screen 13 to display the current operation status and the transaction amount.
110 The clock 26 counts the time being consumed and feeds the data to the automatic vending machine 3 for comparison.

As stated above, when the microprocessor 21 of the RFID module 2 controls the RFID chip 23 to communicate with the RFID stored-value card 4 by means of the sensor 24, the sensor 24 gives a command of "Request std" to the RFID stored-value card 4. After "Answer to Request (ATR)", the RFID stored-value card 4 sends its tagtype to the sensor 24 to establish a communication so that the sensor 24 reads in the serial number and the size byte of the RFID stored-value card 4 and checks the correctness of the ID code. When verified, the sensor 24 operates the RFID stored-value card 4 subject to a selection.

By means of the RFID chip 23, the microprocessor 21 operates the RFID stored-value card 4 to perform a reading, writing, value-adding, value-deducting, storing, transmitting or any other operation and to store the transaction record in the memory 25. As stated above, the microprocessor 21 is electrically connected with the RFID chip 23 by means of the data bus 211, the address bus 212, the control line 213 and the data-address bus 214 so that data, address and control signal transmission can be performed between the microprocessor 21 and the sensor 23. Further, the memory 25 is electrically connected to the microprocessor 21 so that the microprocessor 21 can store each transaction record in the memory 25. Further, the clock 26 is electrically connected to the microprocessor 21 to count each transaction time. When a transaction starts, the microprocessor 21 utilizes the clock 26 to transmit the transaction start time to the automatic vending machine 3 and to count the time. When the transaction surpassed a predetermined length of time, a related process can be preceded, such as cancellation of the transaction, re-establishment of communication with the RFID stored-value card 4, return of bill or other process. Upon termination of the transaction, the microprocessor 21 sends the transaction end time to the automatic vending machine 3 so that the automatic vending machine 3 can store or record the transaction time.

Figure 6:
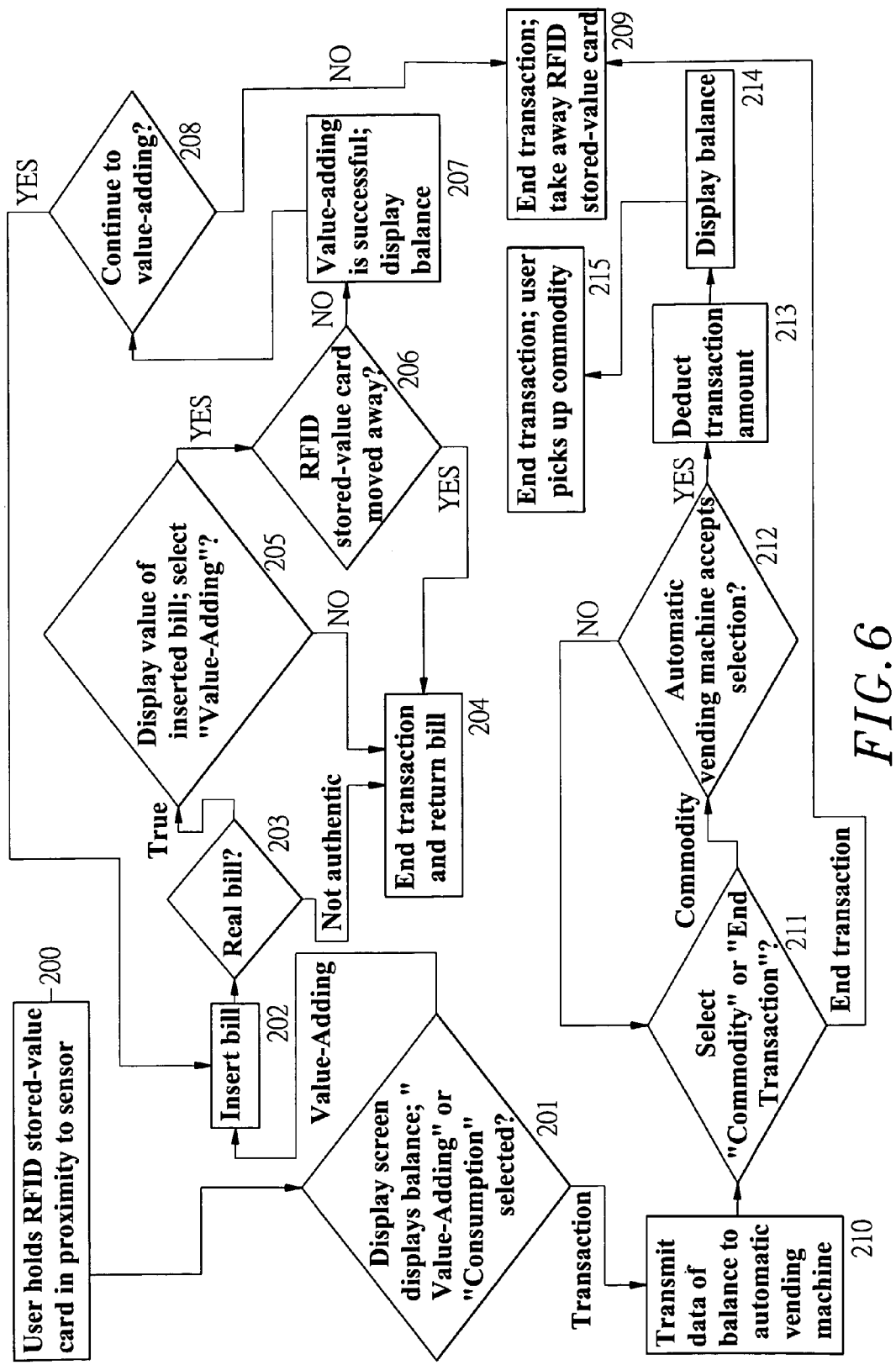
FIG. 6 is an operation flow chart during the use of the face panel assembly with the RFID stored-value card according to the first embodiment of the present invention.

The aforesaid face panel assembly 1 allows the use of a bill or a RFID stored-value card 4 to deal with the automatic vending machine 3. A user can also use the automatic vending machine 3 (face panel assembly 1) to add a value to a RFID stored-value card 4. When a user (cardholder) using the automatic vending machine 3 (face panel assembly 1) to add a value to a RFID stored-value card 4, it runs subject to the following steps (see FIGS. 1 and 6):

200 The user holds a RFID stored-value card 4 in proximity to the sensor 24.
201 The display screen 13 displays the balance of the RFID stored-value card 4 and the user selects "Value-Adding" or "Transaction". And then proceed to step 202 when "Value-Adding" is selected, or step 209 when "Transaction" is selected.

202 The user inserts a bill and then proceeds to step 203.

203 Check the authenticity of the inserted bill, and then proceed to step 204 if the inserted bill is not authentic, or step 205 if the inserted bill is true.

204 End the transaction and return the inserted bill.

205 Display the value of the inserted bill, and then checks whether the user selects "Value-Adding", and then return to step 204 when the user does not select "Value-Adding", or proceed to step 206 when the user selects "Value-Adding".

206 Judges whether or not the RFID stored-value card 4 has been moved away? And then proceed to step 207 if the RFID stored-value card 4 is still kept in position, or return to step 204 if the RFID stored-value card 4 has been moved away.

207 Value-adding is successful and displays the balance, and then proceeds to step 208.

208 The user selects whether or not to continue "Value-Adding"? And then return to step 202 when the user selects to continue "Value-Adding", or proceed to step 208 when not.

209 End the transaction, and the user takes away the RFID stored-value card 4.

210 Transmit the data of balance to the automatic vending machine 3, and then proceed to step 211.

211 The user selects "Commodity" or "End Transaction" and returns to step 209 when "End Transaction" is selected or proceeds to step 212 when "Commodity" is selected.

212 Check whether or not the automatic vending machine 3 accepts the selection, and then proceed to step 213 when the automatic vending machine 3 accepts the selection, or returns to step 211 when the automatic vending machine 3 rejects the selection.

213 Deduct the transaction amount from the RFID stored-value card 4, and then proceed to step 214.

214 Display the balance, and then proceed to step 215.

215 The transaction is ended, and the user picks up the commodity.

Therefore, when a user holds a RFID stored-value card 4 in proximity to the sensor 24 for a certain length of time, the microprocessor 21 of the RFID module 2 establishes a communication with the RFID stored-value card 4 through the RFID chip 23 and the sensor 24, and then verifies the identity of the RFID stored-value card 4. When the identity of the RFID stored-value card 4 is identified to be effective, the microprocessor 21 drives the display screen 13 to display the value stored in the RFID stored-value card 4. At this time, the user operates the operating buttons 12 of the face panel assembly 1 to select the desired operating mode. When "Value-Adding" is selected, the user can then insert a bill through the bill slot 11 of the face panel assembly 1 into the passages 111. At this time, the inserted bill is carried by bill-transfer means of the bill acceptor 31 into the inside of the bill acceptor 31 where the bill acceptor 31 checks the authenticity and value of the received bill. When the authenticity of the inserted bill is recognized, the microprocessor 21 of the RFID module 2 drives the RFID chip 23 and the sensor 24 to write a value-adding signal corresponding to the inserted bill into the RFID stored-value card 4. When "Consumption" is selected, the microprocessor 21 automatically gives the data of currently stored value of the RFID stored-value card 4 to the automatic vending machine 3, and the automatic vending machine 3 gives the data of the transaction amount to the microprocessor 21 after the transaction is finished, so that the microprocessor 21 displays the transaction amount through the display screen 13, and deducts the transaction amount from the RFID stored-value card 4 by means of the RFID chip 23 and the sensor 24. When the user selected to end the transaction, the microprocessor 21 displays the message through the display screen 13, and the user retrieves the RFID stored-value card 4. Further, the user can also use a bill to purchase a commodity from the automatic vending machine 3 directly.

Figure 7:
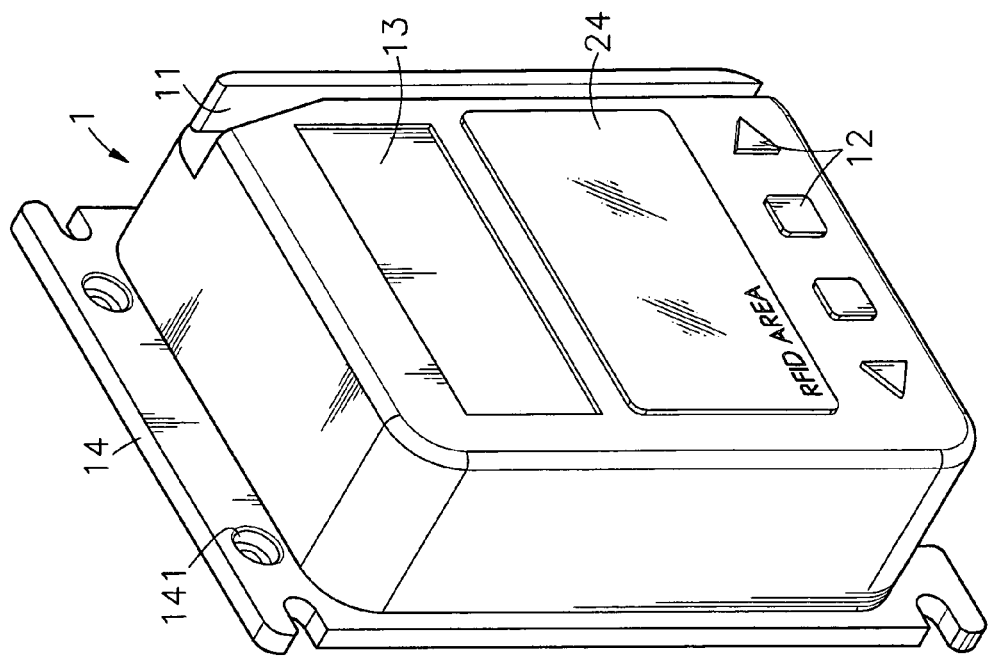
FIG. 7 is an elevational view of a face panel assembly in accordance with a second embodiment of the present invention.

FIG. 7 shows a face panel assembly 1 in accordance with a second embodiment of the present invention. According to this embodiment, the slot 11 is a coin slot. In this case, the acceptor 31 (not shown) to be used with the face panel assembly 1 in an automatic vending machine 3 (not shown) is a coin acceptor, and therefore, the automatic vending machine 3 provides a coin transaction mode and a RFID stored-value card transaction mode.

Figure 8:
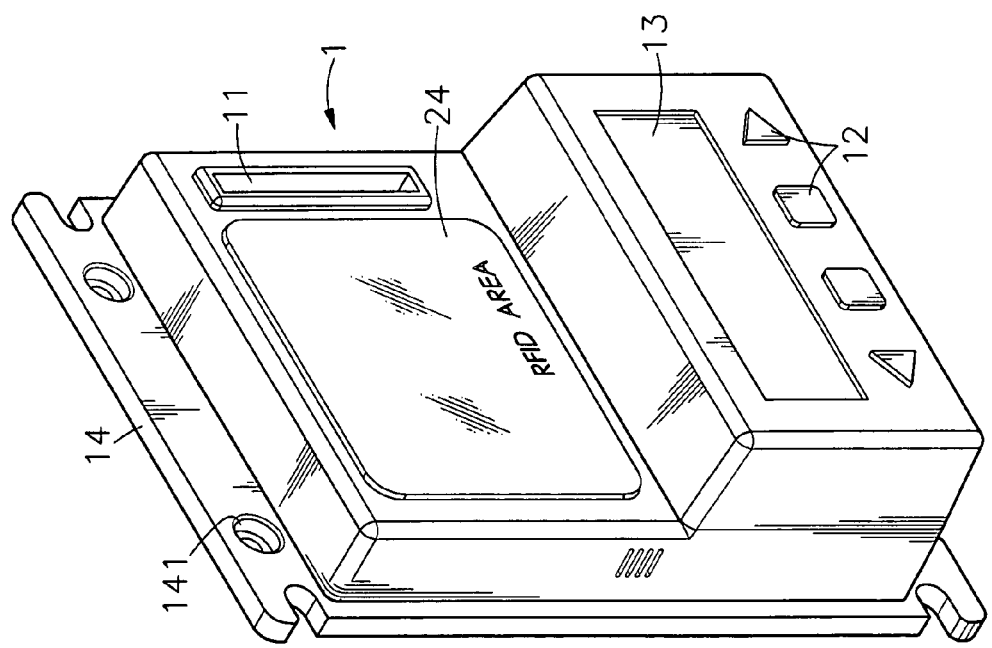
FIG. 8 is an elevational view of a face panel assembly in accordance with a third embodiment of the present invention.

FIG. 8 shows a face panel assembly 1 in accordance with a third embodiment of the present invention. According to this embodiment, the slot 11 is a sliding slot for the sliding of a card (monetary card, credit card, chip card or the like). In this case, the acceptor 31 (not shown) to be used with the face panel assembly 1 in an automatic vending machine 3 (not shown) is a contact type card reader, and therefore, the automatic vending machine 3 provides a card-sliding transaction mode and a RFID stored-value card transaction mode.

Figure 9:
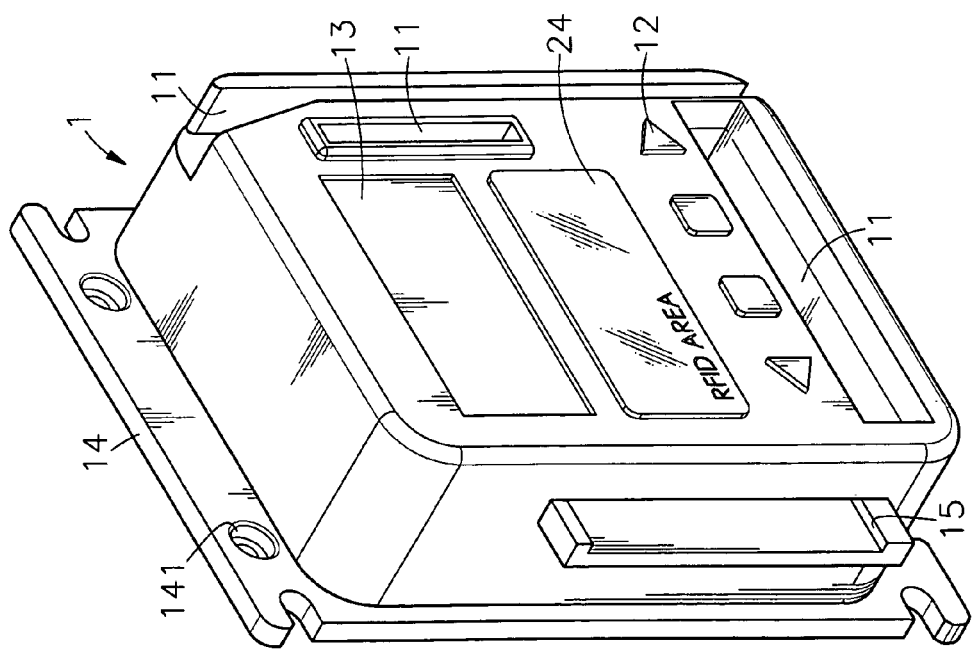
FIG. 9 is an elevational view of a face panel assembly in accordance with a fourth embodiment of the present invention.

FIG. 9 shows a face panel assembly 1 in accordance with a fourth embodiment of the present invention. According to this embodiment, the face panel assembly 1 has three slots 11, a first one for the insertion of a coin, a second one for the insertion of a bill, and a third one for the sliding of a card. The face panel assembly 1 further has a card slot 15 for the insertion of a RFID stored-value card 4. Therefore, the automatic vending machine 3 in which the face panel assembly 1 of this fourth embodiment is used provides multiple transaction modes.

Figure 10:
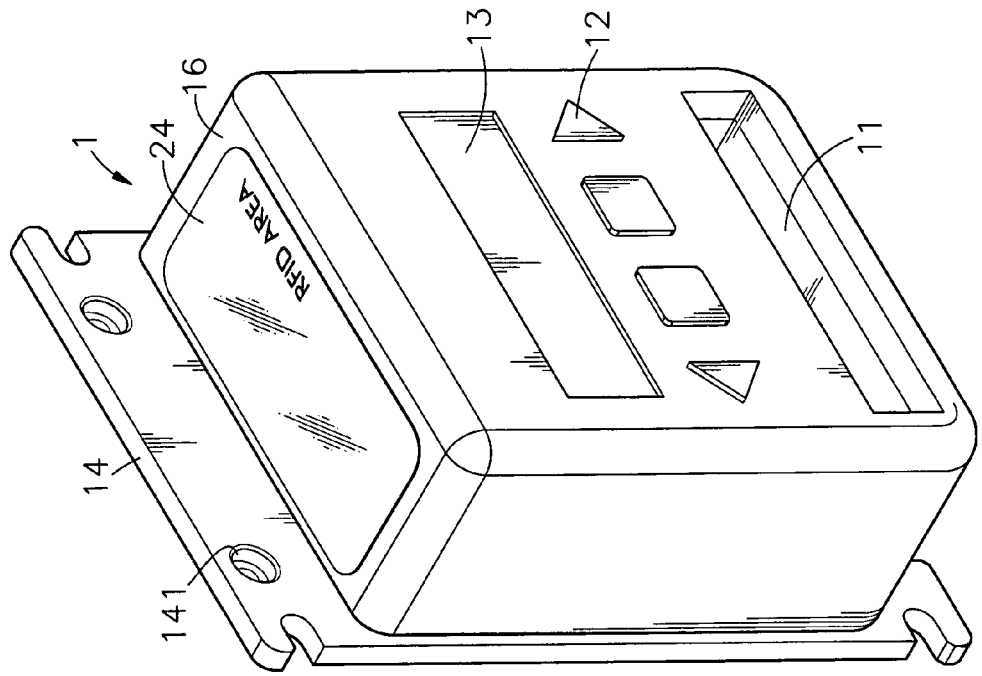
FIG. 10 is an elevational view of a face panel assembly in accordance with a fifth embodiment of the present invention.
Figure 11:
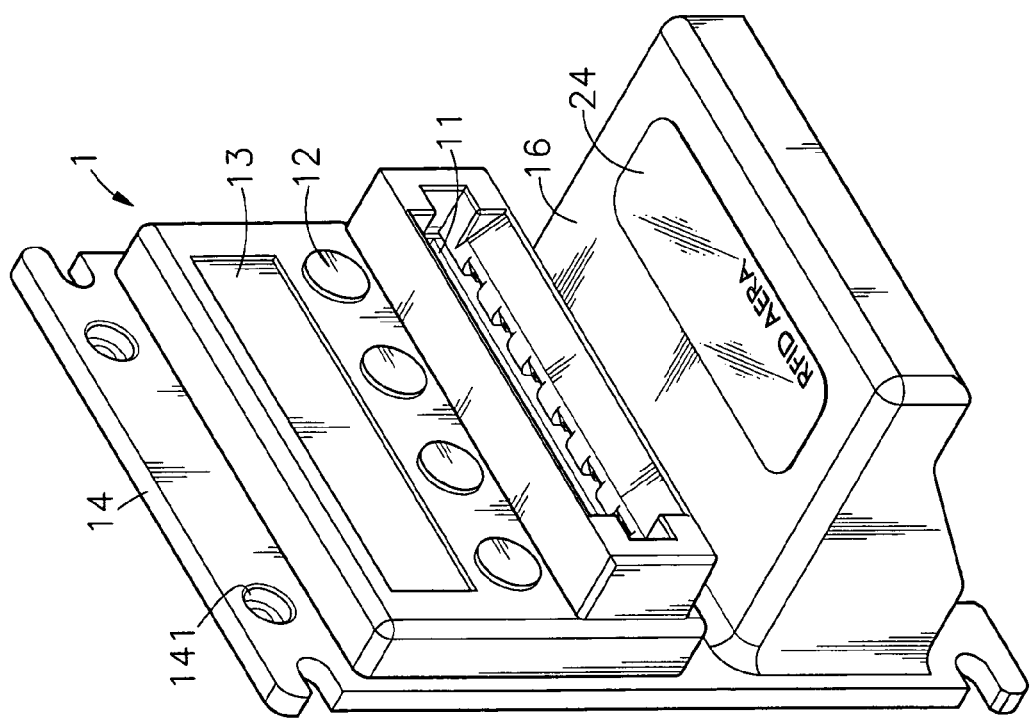
FIG. 11 is an elevational view of a face panel assembly in accordance with a sixth embodiment of the present invention.

FIG. 10 shows a face panel assembly 1 in accordance with a fifth embodiment. FIG. 11 shows a face pane assembly 1 in accordance with a sixth embodiment of the present invention. These two embodiments commonly have a platform 16. The sensor 24 is mounted in the platform 16 in a flush manner. A user can place a RFID stored-value card 4 on the platform 16 corresponding to the sensor 24 to make a transaction. According to the fifth embodiment shown in FIG. 10, the platform 16 is disposed at the top side of the face panel assembly 1. According to the sixth embodiment shown in FIG. 11, the platform 16 protrudes horizontally forwards at the bottom side of the face panel assembly 1.

As stated above, the invention provides a face panel assembly 1 with an RFID module, which has the following features and advantages:

1. In a conventional automatic vending machine having a bill/coin acceptor and an add value machine, the bill/coin acceptor and the add value machine are two separate devices that occupy much internal space of the automatic vending machine. By means of directly attaching a face panel assembly 1 constructed in accordance with the present invention to a bill/coin acceptor 31 for use in an automatic vending machine 3, the size of the automatic vending machine 3 can be greatly reduced. Because a face panel assembly 1 constructed in accordance with the present invention has an RFID module 2 incorporated therein, the use of the bill/coin acceptor 31 with the face panel assembly 1 of the present invention in an automatic vending machine 3 saves the internal space, simplifies the circuit arrangement and facilitates maintenance work.

2. Further, different models of the face panel assembly 1 can be selectively used with different types of acceptors 31 for different automatic vending machines 3. By means of the use of a suitable model of the face panel assembly 1, the automatic vending machine 3 provides a RFID stored-value transaction mode, and a coin transaction mode and/or a bill transaction mode.

3. Further, an automatic vending machine 3 using a face panel assembly 1 constructed in accordance with the present invention provides a value-adding function, allowing a user to operate value-adding to a RFID stored-value card 4.

In conclusion, the invention provides a face panel assembly 1 having an RFID module 2, which is practical for use with a bill/coin acceptor 31 in an automatic vending machine 3 to save machine space and to facilitate machine maintenance work. The use of the present invention in an automatic vending machine 3 enables the machine to provide multiple transaction modes (bill, coin, token and RFID transaction modes).

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A face panel assembly for use with an acceptor in an automatic vending machine, said face panel assembly comprising a mounting flange extending around the periphery at a back side thereof for detachably fastening to said acceptor with fastening means, at least one slot for allowing insertion of money into said acceptor, and a RFID (radio frequency identification) module incorporated therein, said RFID module comprising a sensor disposed on an outside surface of said face panel assembly and adapted for sensing a RFID stored-value card for enabling said RFID module to fetch stored data from said RFID stored-value card and to transmit the fetched data to said automatic vending machine in which said face panel assembly and said acceptor are installed, and a transmission interface for communication between said RFID module and said automatic vending machine in which said face panel assembly and said acceptor are installed.

2. The face panel assembly as claimed in claim 1, which has a passage backwardly extending from said at least one insertion slot for connection to said acceptor to which said face panel assembly is fastened.

3. The face panel assembly as claimed in claim 1, wherein said at least one slot includes a bill slot for the insertion of a bill into said acceptor to which said face panel assembly is fastened, and said acceptor to which said face panel assembly is fastened is a bill acceptor.

4. The face panel assembly as claimed in claim 1, wherein said at least one slot includes a coin slot for the insertion of a coin into said acceptor to which said face panel assembly is fastened, and said acceptor to which said face panel assembly is fastened is a coin acceptor.

5. The face panel assembly as claimed in claim 1, wherein said at least one slot includes a sliding slot for the sliding of a contact type induction card, and said automatic vending machine is a contact type card reader.

6. The face panel assembly as claimed in claim 1, further comprising a card slot electrically connected to said RFID module for the insertion of said RFID stored-value card.

7. The face panel assembly as claimed in claim 1, further comprising a platform for the placing of said RFID stored-value card, said platform having said sensor incorporated therein in a flush manner for sensing said RFID stored-value card.

8. The face panel assembly as claimed in claim 1, further comprising a plurality of operating buttons for operation by a user, and a display screen for displaying data.

9. The face panel assembly as claimed in claim 1, wherein said mounting flange has a plurality of mounting through holes for fastening to said acceptor with screws.

10. The face panel assembly as claimed in claim 1, wherein said RFID module comprises a microprocessor for processing data, and a RFID chip electrically connected to said microprocessor through a data bus, an address buss, a control line and a data-address bus.

11. The face panel assembly as claimed in claim 10, wherein said RFID chip is electrically connected with a sensor for sensing said RFID stored-value card to establish a communication between said RFID stored-value card and said RFID chip for enabling said RFID chip to read and write said RFID stored-value card.

12. The face panel assembly as claimed in claim 10, wherein said RFID module further comprises a memory electrically connected to said microprocessor for storing data.

13. The face panel assembly as claimed in claim 10, wherein said RFID module further comprises a clock electrically connected to said microprocessor for counting the time.

14. The face panel assembly as claimed in claim 10, wherein said RFID module further comprises a monitoring device electrically connected to said microprocessor for reboot when shutdown.

15. The face panel assembly as claimed in claim 1, wherein said transmission interface is a wired transmission interface.

16. The face panel assembly as claimed in claim 15, wherein said wired transmission interface is an IEEE1394 interface, a USB interface, a SATA interface, an IDE interface, a RS232 interface, a parallel SCSI and a serial SCSI interface.

17. The face panel assembly as claimed in claim 1, wherein said transmission interface is a wireless transmission interface.

18. The face panel assembly as claimed in claim 17, wherein said wireless transmission interface is an RF (radio frequency) interface, an infrared interface and a bluetooth interface.

* * * * *